United States Patent [19]
Werz et al.

[11] 3,851,952
[45] Dec. 3, 1974

[54] MACRO-ZOOM LENS SYSTEM

[75] Inventors: Siegfried Werz, Munich; Johann Zanner, Jr., Unterhaching, both of Germany

[73] Assignee: AGFA-Gevaert Aktiengesellschaft, Leverkusen, Germany

[22] Filed: May 7, 1973

[21] Appl. No.: 358,095

[30] Foreign Application Priority Data
May 6, 1972 Germany............................ 2222411

[52] U.S. Cl.................................. 350/187, 350/255
[51] Int. Cl. ........................................... G02b 15/00
[58] Field of Search................... 350/187, 186, 255

[56] References Cited
UNITED STATES PATENTS

| | | | |
|---|---|---|---|
| 3,095,750 | 7/1963 | Mahn | 350/187 X |
| 3,613,544 | 10/1971 | Plihal et al. | 350/187 X |
| 3,661,445 | 5/1972 | Someya | 350/186 |
| 3,731,987 | 5/1973 | Iida et al. | 350/187 |

*Primary Examiner*—Ronald J. Stern
*Assistant Examiner*—Conrad Clark
*Attorney, Agent, or Firm*—Michael S. Striker

[57] ABSTRACT

A macro-zoom lens system comprising a fixed base objective and an adjustable portion having four optical elements, focusing means for focusing the portion of one of the four optical elements, and focal length adjusting means for adjusting the position of a second and third of the four optical elements relative to each other and to the fourth stationarily arranged optical element.

3 Claims, 3 Drawing Figures

3,851,952

MACRO-ZOOM LENS SYSTEM

BACKGROUND OF THE INVENTION

The present invention relates to a macro-zoom lens system which is provided with a stationarily arranged base objective and which as an adjustable portion comprising four optical elements. Focusing means are provided for adjusting the position of the first one of the four optical elements, and focal length adjusting means are provided for adjusting the position of a second and third of the four optical elements relative to each other and to the fourth stationarily arranged optical element.

In macro-zoom lens systems known in the art, the control tracks for changing the focal length are constructed in such a manner that the second and third of the optical elements may steplessly be adjusted over a wide angle position to a macro position, that is a position for close range photography. The two optical elements are thereby movable with the same focal length adjusting means and in the macro region they are moved also in opposite directions. Since the macro adjustment is carried out from the wide angle position of the lens system, the known macro-zoom lens system has the disadvantage that the image scale is not very large and that during very close range photography, the lens system will be difficult to be properly illuminated.

Macro-zoom lens systems are already known which are provided in the rear lens system of the base objective with a movable member which serves for sharp focusing in the macro region. Such lens systems are, however, not included in the above-mentioned group of lens systems with a fixed base objective. In addition, such lens systems are rather complicated in that a further lens member is adjustably arranged and in that the viewfinder has to be provided with a mirror reflex system to avoid problems of parallax.

SUMMARY OF THE INVENTION

It is an object of the present invention to provide from a known lens system with a fixed base objective without changing the optical construction, a macro-zoom lens system in which in comparison with conventional systems of this kind greater image scales may be obtained without encountering illumination difficulties.

It is a further object of the present invention to provide a macro-zoom lens system of the aforementioned kind which is composed of relatively few and simple parts so that the system may be constructed at relatively low cost and stand up perfectly under extended use.

With these and other objects in view, which will become apparent as the description proceeds, the macro-zoom lens system according to the present invention mainly comprises a fixed base objective and an adjustable portion having four optical elements, focusing means for adjusting the position of a first one of the four optical elements, focal length adjusting means for adjusting the position of the second and third of the optical elements relative to each other and to the fourth of the optical elements which is stationarily arranged in which the focal adjusting means comprises macro-adjusting means engageable with the second and the third optical elements for adjusting the position of this second and third element in fixed relationship to each other relative to the fourth element from a normal telephoto position to a macro position. The focal length adjusting means for adjusting the position of the second and third optical elements may comprise at least one control member provided with separate or connected pairs of varifocal and macro cam tracks. Advantageously, the control members are in the form of control discs. However, it is also possible to provide a single control member in form of a control cylinder. It is also advantageous to provide shiftable means for selectively connecting the second and the third of the optical elements with cam tracks of one or with cam tracks of the other of two control members. Such a shiftable means are preferably provided for the focal length adjusting means.

The shiftable means may also be provided with means cooperating with the focusing means for adjusting the position of the first one of the four optical elements during shifting of the shiftable means.

Advantageously, a locking arrangement is also provided which prevents shifting of the shiftable means in all positions of the second and third of the optical elements with exception when these optical elements are in the normal telephoto position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
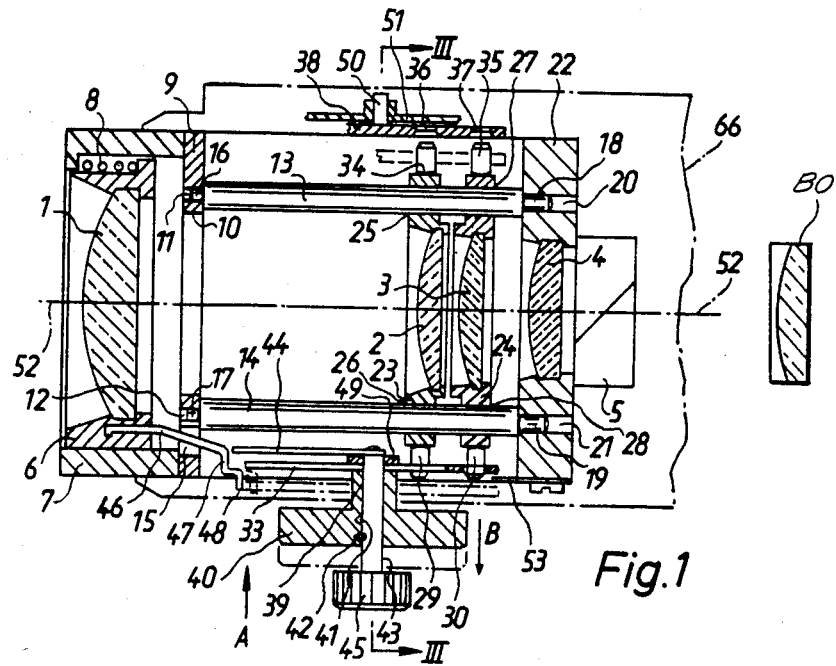
FIG. 1 is a horizontal cross section through the adjustable position of the macro-zoom lens system in the normal telephoto position thereof.
Figure 2:
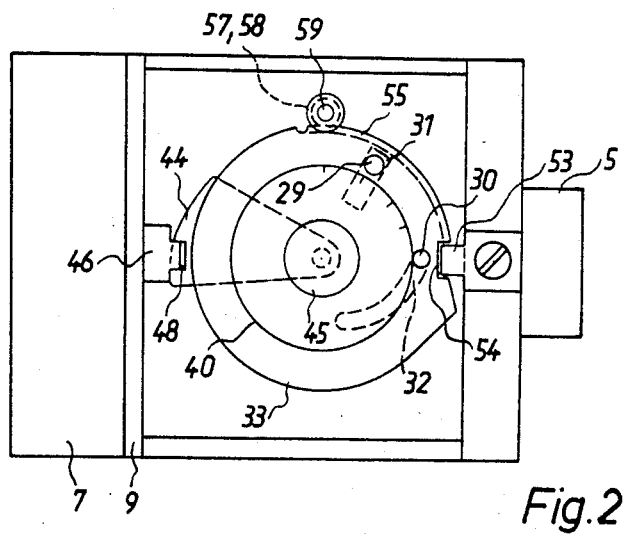
FIG. 2 is a side view of FIG. 1 as viewed in the direction of the arrow A.

Referring now to FIG. 1, it will be seen that the macro-zoom lens system according to the present invention comprises an adjustable portion including a focusing lens system 1, a second and a third movable lens system 2 and 3 for changing the focal length of the system and a fourth stationarily arranged lens system 4. These lens systems of the adjustable portion are known per se and therefore the various lens systems or groups of lenses are illustrated each only in a simplified manner as a single lens. A dividing prism 5 is mounted closely adjacent the lens system 4, which has the purpose to deflect part of the rays passing through the objective into a viewfinder system, not illustrated in the drawing. The adjustable portion of the macro-zoom lens system is advantageously arranged as an afocal attachment in front of a stationarily arranged base objective BO. The lens mounting 6 of the focusing lens group 1 is slidably mounted in a front barrel 7 and biased toward the right, as viewed in FIG. 1, by means of a plurality of springs 8 distributed angularly spaced from each other about the outer periphery of the lens mounting 6. For simplification reasons, only one of the springs 8 is shown in the drawing. A plate 9 is arranged rearwardly of the front barrel 7. The plate 9 is provided with a large central opening 10 for the passage of light rays therethrough, two small bores 11 and 12 arranged laterally of the central opening 10, and a further opening 15 arranged laterally and outwardly of the bore 12. A pair of guide pins 13 and 14 are provided which project with small diameter portions 16 and 17 thereof into the bores 11 and 12 of the plate 9 and with similar small diameter end portions 18 and 19 at the other ends of the guide pins into bores 20 and 21 provided in the lens mounting 22 of the stationarily arranged lens group 4. The lens mountings 23 and 24 of the movable lens groups 2 and 3 are respectively provided with bores 25, 26, 27 and 28 through which the guide pins 13 and 14, respectively, extend to thus guide the lens groups 2 and 3 movable in direction of the guide pins 13 and 14. The lens mountings 23 and 24 are further provided with radially projecting pins 29 and 30 engageable with cam tracks or cam slots 31 and 32 of a varifocal control disc 33 and with a pair of further radially projecting pins 34 and 35 engageable with cam tracks or cam slots 36 and 37 of a macro-control disc 38. The varifocal control disc 33 is connected by means of a bushing 39 with the focal length adjusting ring 40. The control disc 33, the bushing 39 and the adjusting ring 40 are movable along a shaft 43 between two rest positions established by a pair of axially displaced catch means 41 and 42 of standard construction, schematically shown in FIG. 1, and comprising a pair of cavities in the adjusting ring 40 and a spring processed ball connected with the shaft 43. A focusing knob 45 is connected to the outer end of the shaft, whereas a segment 44 having a peripheral cam curve is fixedly connected to the inner end of the shaft 43 for turning therewith. A transmission arm 46 fixedly connected at its left end, as viewed in FIG. 1, to the lens mounting 6 of the focusing lens system 1 projects through the opening 15 in the plate 9 toward the segment 44 and this arm has a downwardly bent portion 47 engaging the peripheral curve of the segment 44 and acting as a follower on the latter. The arm 46 has a further inwardly and downwardly extending portion 48 adapted to move, when the follower portion 47 becomes disengaged from the segment 44 during turning of the latter, beneath the disc 33, to thereby prevent axial movement of the latter from the full-line to the dash-dotted line position. The shaft 43 is turnably mounted in bearing 49. The macro-control disc 38 is by means of a trunnion 50 axially shiftable mounted in a bushing on a plate 51, which is fixedly connected to the housing 66, indicated in dash-lines in FIG. 1. The cam tracks or cam slots 36 and 37 formed in the control disc 38 are constructed in such a manner that, during turning of the disc 38 about the axis of the trunnion 50 and engagement of the pins 34 and 35 in the cam slots 36 and 37, respectively, when the control disc 38 is shifted to the dash-line position shown in FIG. 1, the movable lens systems 2 and 3 connected thereto will be moved uniformly, while maintaining their position relative to each other according to the telephoto position thereof, along the optical axis 52 of the lens system. A lock spring 53 fixed to the stationary lens mounting 22 is provided to assure that the varifocal control disc 33 can only be moved to the dash-dotted line position, shown in FIG. 1, in the telephoto position of the lens system illustrated in FIG. 1 in which the projecting portion of the spring 53 will be axially aligned with the cutout 54 in the control disc 33, as shown in FIG. 2. FIG. 2 schematically also shows the cam tracks or cam slots 31 and 32 of the control disc 33.

Figure 3:
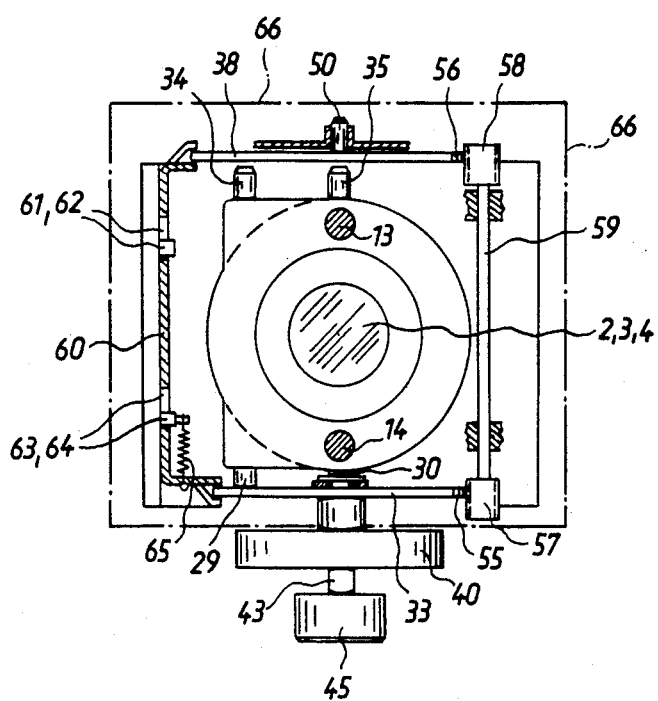
FIG. 3 is a cross section taken along the line III—III of FIG. 1.

FIG. 3 illustrates the cooperation of the control disc 33 with the control disc 38. Both control discs 33 and 38 are provided over part of their outer circumference with the gear teeth 55, 56, respectively, which mesh with the pinions 57 and 58 fixedly mounted at opposite ends of a transmission shaft 59 which is turnably mounted in bearings, as indicated in FIG. 3. A connecting link 60 connects the control disc 38 with the control disc 33 for simultaneous shifting in axial direction, whereby the two discs 33 and 38 remain coupled with each other for simultaneous turning about their axes by the shaft 59 and pinions 57 and 58 on the shaft ends which mesh with the gear teeth 55 and 56, respectively, provided on part of the periphery of the discs 33 and 38. The connecting link 60 is guided for movement in longitudinal direction by means of fixed pins 61 and 64 engaging the longitudinal slots 62 and 63 formed in the link 60. A tension spring 65, connected at opposite ends to the pin 64 and to the connecting link 60, biases the latter in upward direction.

The macro-zoom lens system above described is insertable in the camera housing 66 indicated in dash-dotted lines in FIG. 1.

The functioning of the described lens system during the varifocal adjustment is known per se. In the position of the focal lens adjusting ring 40 shown in full lines in FIG. 1 the two lens groups 2 and 3 are connected with the control disc 33 and thus movable along the optical axis 52 by turning of the focal lens adjusting ring 40 about its axis. The lens groups or optical elements 2 and 3 are thereby moved relative to each other in a known manner. The optical element 2 serves during such adjustment to change the focal length and the optical element is moved to correct the distance between back lens and image so that the distance of the image plane to the base objective must not be changed. The focusing knob 45 serves also to sharply focus the lens system since the focusing lens system 1 is adjustable by means of the segment 44 and the connecting arm 46. In order to properly focus on a closely arranged object, the focusing lens system 1 is moved against the action of the springs 8 forwardly of the camera housing 66. The shortest distance of an object which may thus be properly focused is about 1 meter.

The movable optical elements 2 and 3 are illustrated in FIG. 2 in the telephoto position whereas in the wide angle position, the two elements 2 and 3 are moved further apart from each other than shown in FIG. 1.

In the known macro-zoom lens system mentioned in the introductory paragraph the cam tracks of the varifocal control arrangement which are arranged on a cylinder are provided with extensions by means of which the corresponding optical elements 2 and 3 are moved according to another interrelationship from the wide angle position again towards each other to thus obtain the extreme short range focus. This has the disadvantage that the image angle will remain relatively large so that the image scale will not be very great. In order to obtain a greater image scale it would be necessary that the object to be viewed is brought closely before the focusing lens which, especially if the picture is taken in artificial light, leads to great illuminating difficulties.

These difficulties are avoided with a macro-zoom lens system according to the present invention. In contradistinction to the known macro-zoom lens system, the macro or close range adjustment is obtained with the lens system according to the present invention from the telephoto position of the lens system. For this purpose, the focusing knob 45 is first brought in the position shown in FIG. 1 in which the optical elements 2 and 3 will reach the telephoto position with the largest focal length. By turning the focusing knob 45, the focusing lens system, is brought in the position shown in FIG. 1. The focal length adjusting ring 40 can now be moved in the direction of the arrow B since the locking member 53 will be aligned with the cutout 54. When the focal length adjusting ring 40 is moved in the direction of the arrow B, it will be arrested by the second latch means 42 on the shaft 43. Simultaneously with the movement of the focal length adjusting ring 40 to the position shown in dash-dot lines in FIG. 1, the control discs 33 and 38 will also be brought into the dash-dot line positions in which the pins 29 and 30 of the optical elements 2 and 3 become disengaged from the cam slots in the control disc 33 while the pins 34 and 35 of the optical elements 2 and 3 will become engaged in the cam slots 36 and 37 of the control disc 38. The simultaneous movement of the control disc 38 towards the control disc 33 is obtained by the connecting link 60 shown in FIG. 3. By turning of the focal length adjusting ring 40, it is possible to obtain now a sharp focusing at close range since the control disc 38 is, through the shaft 59 and the described gear ring, connected to the control disc 33 and therewith with the focal length adjusting ring 40. For adjustment at close range, the two optical elements 2 and 3 are now moved in the same direction while maintaining their position relative to each other to which they have been brought in the telephoto position. In this way, it is possible to obtain a sharp focusing with the focusing lens system 1 up to infinity.

In the range for close-up photography, the adjustment of the lens system 1 has only a secondary role so that the locking arrangement 48 for the front lens system 1 which assures that the shifting of the lens system into the range for close-up photography will be only possible when the focusing lens system 1 is moved by the segment 44 to the forwardmost position, is not absolutely necessary. The advantage of the lens system according to the present invention as compared to such systems known in the art is that even at large distance of the object in the close range region a very small image angle may be obtained so that even when the object has to be spaced farther from the focusing lens system 1 for proper illumination, relative great image scales may be obtained. A further essential advantage is also that the optical system of the varifocal objective has not to be changed in order to make it usable also for the close-up range photography. The image in the close-up range is thereby nearly distortion-free.

To switch over from the varifocal range into the close-up range it is necessary, as mentioned before, to bring the optical elements 2 and 3 first in the telephoto position.

Thus, for instance, it is also possible to construct the focusing knob 45, in a manner not shown in the drawing, shiftable along the shaft 43 and to connect the control disc 33 to the shiftable focusing knob so as to shift the control disc 33 and the control disc 38 connected thereto, in the manner as described, between the positions shown in full lines and dash-dotted lines in FIG. 1. It is also possible to provide separate shifting means for shifting the two control discs independent from the position of the focal length adjusting ring or the focusing knob in axial direction between the full line and the dash-dotted line position illustrated in FIG. 1.

If instead of two control discs, as illustrated and described, a control cylinder is used, then it is advantageous to continue the varifocal cam tracks with cam tracks for close-up photography at the location at which the end position for the telephoto position of the lens system is reached so that the two control members for the varifocal and close range adjustment of the optical elements 2 and 3, which in the illustrated embodiment are formed by control discs, may be incorporated in a single control member. Evidently it is also possible to provide projecting pins on the control discs 33 and 38 and appropriate cam tracks engageable and disengageable with these pins on the lens mounting of the optical elements 2 and 3. It is also possible to provide the lens system according to the present invention with a motor drive.

It will be understood that each of the elements described above, or two or more together, may also find a useful application in other types of zoom-lens systems for normal and close-up photography differing from the type described above.

While the invention has been illustrated and described as embodied in a zoom-lens system for normal and close-up photography, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A macro-zoom lens system comprising a fixed base objective and an adjustable portion having four optical elements; focusing means for adjusting the position of a first one of said four optical elements; focal length adjusting means for adjusting the position of a second and third of said optical elements relative to each other and to the fourth of said optical elements which is stationarily arranged, said focal length adjusting means comprising two control discs, one constituting a macro-adjusting means engageable with said second and said third optical element for adjusting the position of said second and said third element in fixed relationship to each other relative to said fourth element from a telephoto position to a close-up range position, said discs being turnable about a common axis, one of said discs being provided with a pair of cam tracks for close-up photography and the other with a pair of varifocal cam tracks, shiftable means including link means connecting said discs movable together in the direction of said axis between two end positions, in one of which said second and said third optical element are connected to the cam tracks of one of said discs while in the other of said end positions said second and said third optical element are connected to the cam track of the other of said discs, and means for coupling said discs for simultaneous rotation about said axis.

2. A macro-zoom lens system as defined in claim 1, wherein said focusing means comprise a focusing ring turnable about said axis and shiftable in axial direction between said two end positions, said focusing ring being connected to one of said discs so as to shift and turn the latter and the other disc connected thereto during shifting and turning of said focusing ring, and including means operatively connected to said focusing ring and cooperating with said first optical element for adjusting the position thereof during turning of said focusing ring.

3. A macro-zoom lens system as defined in claim 1, and including locking means permitting movement of said shiftable means between said two end positions only when said second and said third elements are in said telephoto position.

* * * * *